United States Patent [19]
DeCrescent

[11] Patent Number: 5,064,376
[45] Date of Patent: Nov. 12, 1991

[54] PORTABLE COMPACT SIMULATED TARGET MOTION GENERATING SYSTEM

[75] Inventor: Ronald DeCrescent, Northridge, Calif.

[73] Assignee: Unisys Corporation, Detroit, Mich.

[21] Appl. No.: 481,284

[22] Filed: Apr. 1, 1983

[51] Int. Cl.⁵ .............................................. G09B 9/00
[52] U.S. Cl. .......................................... 434/2; 342/169
[58] Field of Search ................. 434/2, 3; 343/17.7; 342/169

[56] References Cited

U.S. PATENT DOCUMENTS

| | | | |
|---|---|---|---|
| 3,445,577 | 5/1969 | Sperling et al. | 434/2 |
| 3,514,521 | 5/1970 | Burchard et al. | 434/2 |
| 3,571,479 | 3/1971 | Horattas et al. | 434/2 |
| 3,783,172 | 1/1974 | Bernstein | 434/2 |
| 4,424,038 | 1/1984 | Tingleff et al. | 434/2 |

*Primary Examiner*—Thomas H. Tarcza
*Assistant Examiner*—Mark Hellner
*Attorney, Agent, or Firm*—Nathan Cass; Robert S. Eramson; Mark T. Starr

[57] ABSTRACT

A portable compact target motion simulation system, adapted to generate simulated target motion for displaying, tracking, and controlling a plurality of simulated targets on a display device for training purposes. The system is operable to generate pre-programmed and dynamic exercises, for training trainees in operating tracking devices, to develop trainee skill in analyzing and responding properly to target motion.

The apparatus is totally programmable, and capable of providing targets in any matrix. It includes a target display generator, adapted to store, merge, and transmit timed data signals for driving a target-display device. It further includes a dynamic target motion generator, microprocessor-based, adapted to receive input data identifying the characteristics of particular operator-controlled targets and convert such data into dynamic target motion input data for driving the target display generator. A remote input device, microprocessor-based, enables the operator to interface with and control the functions of particular targets in the target display generator, by inputting target motion initiation and modification data into the dynamic target motion generator, for generating a display to train the trainee.

The apparatus further includes a pre-programmed target motion generator, microprocessor-based, operable in conjunction with a data storage and retrieval device, to generate pre-programmed target motion for demonstrating certain target motion functions, or as a background for dynamic target motion for driving the target display generator, or to store data from the pre-programmed target motion generator and dynamic target motion generator after display thereof, for subsequent debriefing purposes.

10 Claims, 12 Drawing Sheets

|  |  | $x_1$ | OFF | MTC | MPY |  |  |
|---|---|---|---|---|---|---|---|
|  | xyRQST |  |  |  |  |  | $\overline{\text{nySTRB}}$ |
|  |  | mya | 0 | 0 | 1 | $\overline{\text{yQWIK}}$ |  |
|  |  | myb | 0 | 0 | 1 | $\overline{\text{yQWIK}}$ |  |
|  |  | myc | 0 | 0 | 0 |  |  |
| $\Delta x > 2°$ → |  | $x_2$ |  |  |  | $(\overline{\text{xMEMW}})$ |  |
|  | xyRQST |  |  |  |  |  |  |
|  |  | mya | 0 | 1 | 1 | $\overline{\text{yQWIK}}$ |  |
| $\Delta x = 2°$ |  | myb | 0 | 1 | 1 | $\overline{\text{yQWIK}}$ |  |
|  |  | myc | 0 | 1 | 0 |  |  |
|  | myRQST |  |  |  |  |  |  |
|  |  | mya | 0 | 1 | 1 | $\overline{\text{yQWIK}}$ |  |
| $\Delta x = 1°$ |  | myb | 0 | 1 | 1 | $\overline{\text{yQWIK}}$ |  |
|  |  | myc | 0 | 1 | 0 |  |  |
|  | oyRQST |  |  |  |  |  |  |
|  |  | oya | 1 | 1 | 1 | $\overline{\text{yQWIK}}$ |  |
| $\Delta x = 1°$ |  | oyb | 1 | 1 | 1 | $\overline{\text{yQWIK}}$ |  |
|  |  | oyc | 1 | 1 | 0 |  |  |
|  | myRQST |  |  |  |  |  |  |
|  |  | mya | 0 | 1 | 1 | $\overline{\text{yQWIK}}$ |  |
| $\Delta x = 1°$ |  | myb | 0 | 1 | 1 | $\overline{\text{yQWIK}}$ |  |
|  |  | myc | 0 | 1 | 0 |  |  |
|  | oyRQST |  |  |  |  |  |  |
|  |  | oya | 1 | 1 | 1 | $\overline{\text{yQWIK}}$ |  |
| $\Delta x = 2°$ |  | oyb | 1 | 1 | 1 | $\overline{\text{yQWIK}}$ |  |
|  |  | oyc | 1 | 1 | 0 |  |  |
|  | myRQST |  |  |  |  |  |  |
|  |  | mya | 0 | 0 | 1 | $\overline{\text{yQWIK}}$ |  |
| $\Delta x > 2°$ |  | myb | 0 | 0 | 1 | $\overline{\text{yQWIK}}$ |  |
|  |  | myc | 0 | 0 | 0 |  |  |
|  |  | $x_8$ |  |  |  |  |  |
|  | xyRQST |  |  |  |  | $(\overline{\text{xMEMW}})$ |  |
|  |  | mya | 0 | 0 | 1 |  |  |
|  |  | myb | 0 | 0 | 1 |  |  |
|  |  | myc | 0 | 0 | 0 |  |  |

FIG. 12

PORTABLE COMPACT SIMULATED TARGET MOTION GENERATING SYSTEM

BACKGROUND OF THE INVENTION

The invention relates generally to devices for simulating motion. It relates specifically to an apparatus for generating simulated motion of a plurality of targets on a target motion display device for providing exercises for trainees in operating target-tracking devices.

The prior art includes devices for providing exercises for trainees by generating simulated target motion, such as simulated targets moving on radar screens for training weapons controllers or air traffic controllers. Such devices were aided by large off-line main-frame computers for generating pre-programmed displays, and analog computers for generating dynamic displays, which computed target parameters for display on a display device. The output from such devices were stored on data storage media and fed into production systems, where it drove a motion picture camera which produced a film thereof. Special simulation equipment was then used to play the film, and inject the data therefrom electronically into a display device such as a radar screen. Some prior art devices use film, some used software simulation, and some used cassettes.

However, the prior art systems were not closed loop systems with positive feedback for training, and did not enable self or one-on-one instructional training. They were very large, slow, cumbersome, and expensive. Further, they were complex and difficult to use, and required personnel trained in maintenance, and/or operators extensively trained in computers and/or electronics, as support and operating personnel, making it difficult to access the large readily available group of non-technical personnel. Such systems were inconvenient and inefficient to use, requiring large fixed-location facilities, and were not capable of field use under actual target motion tracking and response conditions.

SUMMARY OF THE INVENTION

The invention is adapted to overcome the above problems and others associated with the prior art. It provides a target motion simulation system, which is portable and compact, so as to be readily accommodated in presently-existing tracking system vehicles, and so as to be readily transported from place to place for field use, or for use in fixed structures, for training purposes. It is usable in conjunction with a variety of sensory systems, such as a radar or sonar. It provides a closed loop system, with positive feedback, for self or one-on-one instructional training.

The generator includes remote input panels, which enable an operator having little technical training to interface with the system to control system functions, such as data storage and retrieval, and to control movement of particular real-time controlled dynamic targets for training purposes. The remote input panel is readily operable by non-technical operators, not requiring persons trained in computers or electronics for set-up or use thereof, making it convenient and efficient to use. It is modular, making it easy to maintain.

A cassette tape data retrieval and storage device is operable in conjunction with a pre-programmed target motion generator, for retrieving pre-programmed simulated target motion, consisting of a plurality of targets moving in prescribed trajectories as calculated by a pre-programming system, providing a demonstration of certain target movement functions, or as a background for dynamic target movement in the system. The pre-programmed generator is further operable for storing displays of the trainee's responses to the simulated target motion after display thereof, for use for debriefing purposes.

DETAILED DESCRIPTION OF THE INVENTION

The invention, as shown in the figures and as described herein, comprises a simulated target motion generator, connectable to a display device A, such as a plan position indicator for displaying radar tracking signals for aircraft tracking. The display device A includes a screen B, such as a cathode ray tube, on which may be displayed targets C, for example, in the form of dots showing raw radar returns from aircraft, formatted in the rho-theta plane; the device may further be formatted for positional display in any required message format for interpretation and display on alpha-numeric control and display equipment.

The simulated target motion generator, as shown in FIGS. 1-12, includes a target display generator 10, adapted to generate the interfacing signals required to drive the display device A to which it is connectable. Display generator 10 is operable to convert digital inputs to analog outputs for driving display device A. It is further operable to take binary data, describing, for example, control signals such as the azimuth and range of the target, and other control signals, and compares such data with data as to the current azimuth and range of such target. Upon comparing, it transmits a signal to generate a target display, using an unblanking pulse to generate a target return on the display device.

Display generator 10 has three primary sub-functions. It is a mode controller, providing commands to the computer system and advising of the current condition of the display. It functions as a memory storage and strobe to receive and store a single section of data, time it with the radar signals, and transmit it to display device A at the proper time. It is further an input/output interface, to buffer the signals and convert them to the types of signals that display device A requires.

A dynamic target motion generator 12, microprocessor-based, receives commands from outside controls, such as keybuttons, terminals, or joysticks, which describe where the operator operating such controls wants a real-exercise-time, controlled, target initially positioned, or wants the trajectory changed to. It provides trigonometric functions which convert command data into positional data required for motion in space, such as azimuth, range, speed, velocity, and heading, which data is then transmitted to the display generator 10.

A plurality of remote input panels 14, 16 enable the controller to interface with the system to generate training excercises. Each panel 14 and 16 is identical, and enables the controller to control system functions, and to control the movement of dynamic targets C under the control thereof. Any number of such panels may be used as desired by the operator, so long as sufficient data transfer speed, computer power, and memory are provided. The number of targets C under the control of each panel may, for example, comprise four.

Each panel 14 or 16 is microprocessor-based, as a stand-alone computer, which enables the operator to initiate a controlled target, such as C, or to control movement thereof, by keying in through the keyboard, such as 18 or 20, and transmitting a complete message, to either create a target at a particular positional location, or to take a current target and advise the dynamic generator 12 of desired positional changes, calculated in dynamic generator 12 and transformed into display positional data.

Each panel 14 or 16 further includes a display, such as 22 or 24, enabling the controller to monitor the current status of any target C which such panel controls, and to read out the current mode of system functions, as well as enabling inputting of data as described above.

Pre-programmed generator 26 is micro-processor based, and provides input to a data retrieval and storage device 28 for storage thereof, as well as operating on preprogrammed data stored in device 28 upon retrieval thereof from device 28. Such retrievable data comprises pre-programmed target positional data for demonstrating certain target movement operations, or for providing a background for dynamic target motion. It functions for storage to correlate with the dynamic generator 12, when operating both simultaneously, to make certain that all of generator 12 dynamic data merges in range and azimuth with all of generator 26 pre-programmed data previously displayed, for recording. It further transmits retrieved pre-programmed data to display generator 10 for transmission to display device A.

Upon operating in a storage mode, pre-programmed generator 26 receives dynamic target motion data from dynamic generator 12, together with its own data as background, after display thereof, for storage on device 28, enabling reiterative building of training exercises, as well as training and debriefing on the performance of trainees during the training exercise upon retrieval thereof, for critiquing and describing proper procedures. Critiquing and debriefing in real time, as the system is operating, is enabled by viewing screen B.

Device 28 may comprise, for example, a cassette tape system for recording pre-recorded and dynamic digital data or playing back pre-recorded digital data, connectable to pre-programmed generator 26. Device 28 may be self-contained in pre-programmed generator 26. It is further usable for loading an operating system program cassette therein, containing all system intelligence, for operating the system. To change system characteristics, such as target calculations, timing, data flow, message formatting, or other functions, changes are readily made only in the software operating system program cassette, without requiring any hardware modification.

The display generator may be software-driven, by reformatting messages in software through a data-communications port to input to a display device A which reads data messages.

The display generator 10 includes memory which may, for example, function to store, as display, a single sector of defined azimuth and range for target display at a time. The dynamic and pre-programmed generators 12 and 26 include memories which store the next page of revolution. The main computer memory stores a number of pages of revolution, and the device 28 stores further pages of pre-programmed revolutions. On operation, the device 28 refreshes information stored in the computer, the computer refreshes generators 12 and 26, and the generators 12 and 26 refresh generator 10, for generating displays on device A.

Figure 1:
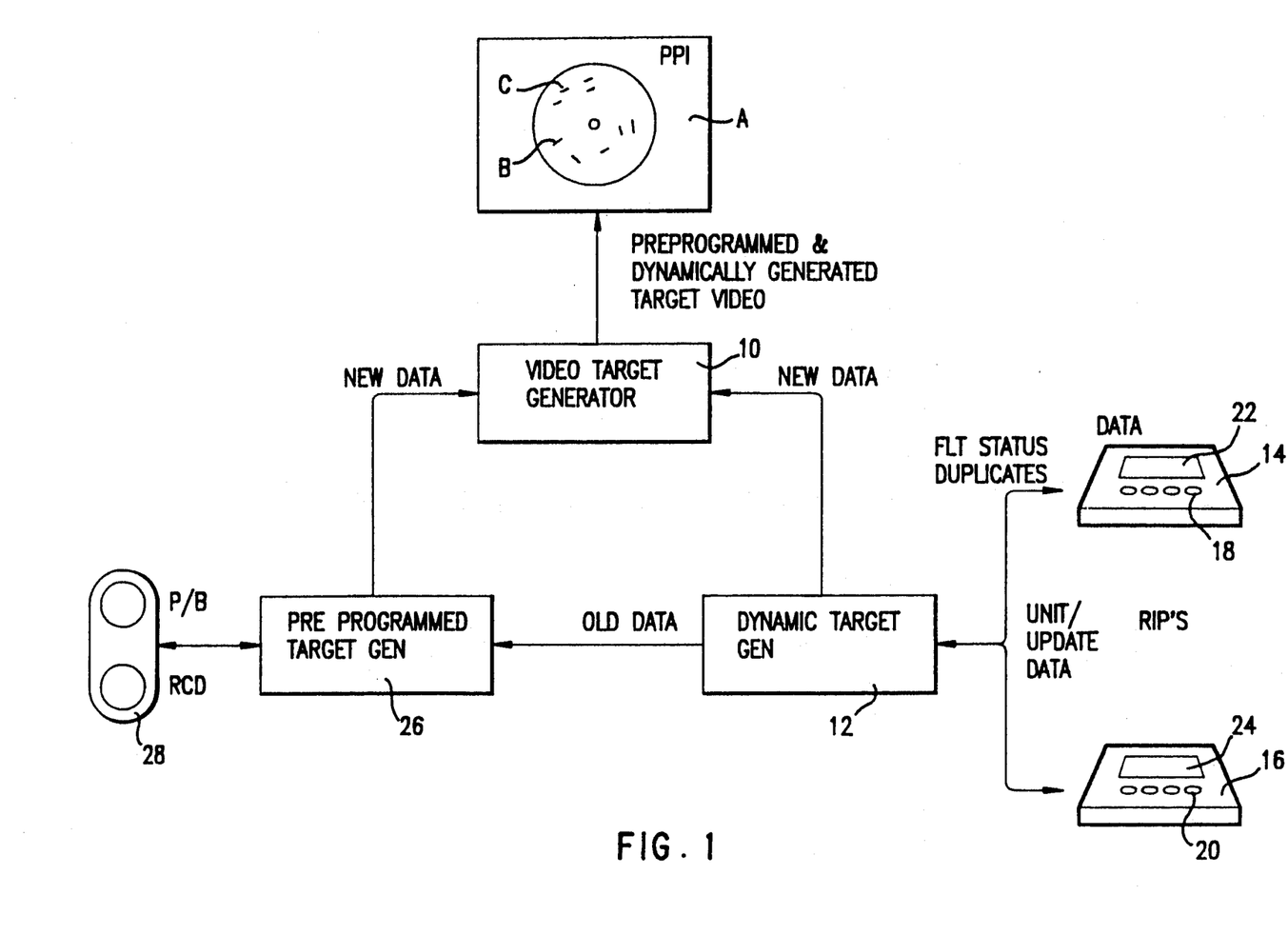
FIG. 1 is a partly-schematic block diagram of the simulated target motion generator of the invention, connected to a display device.
Figure 2:
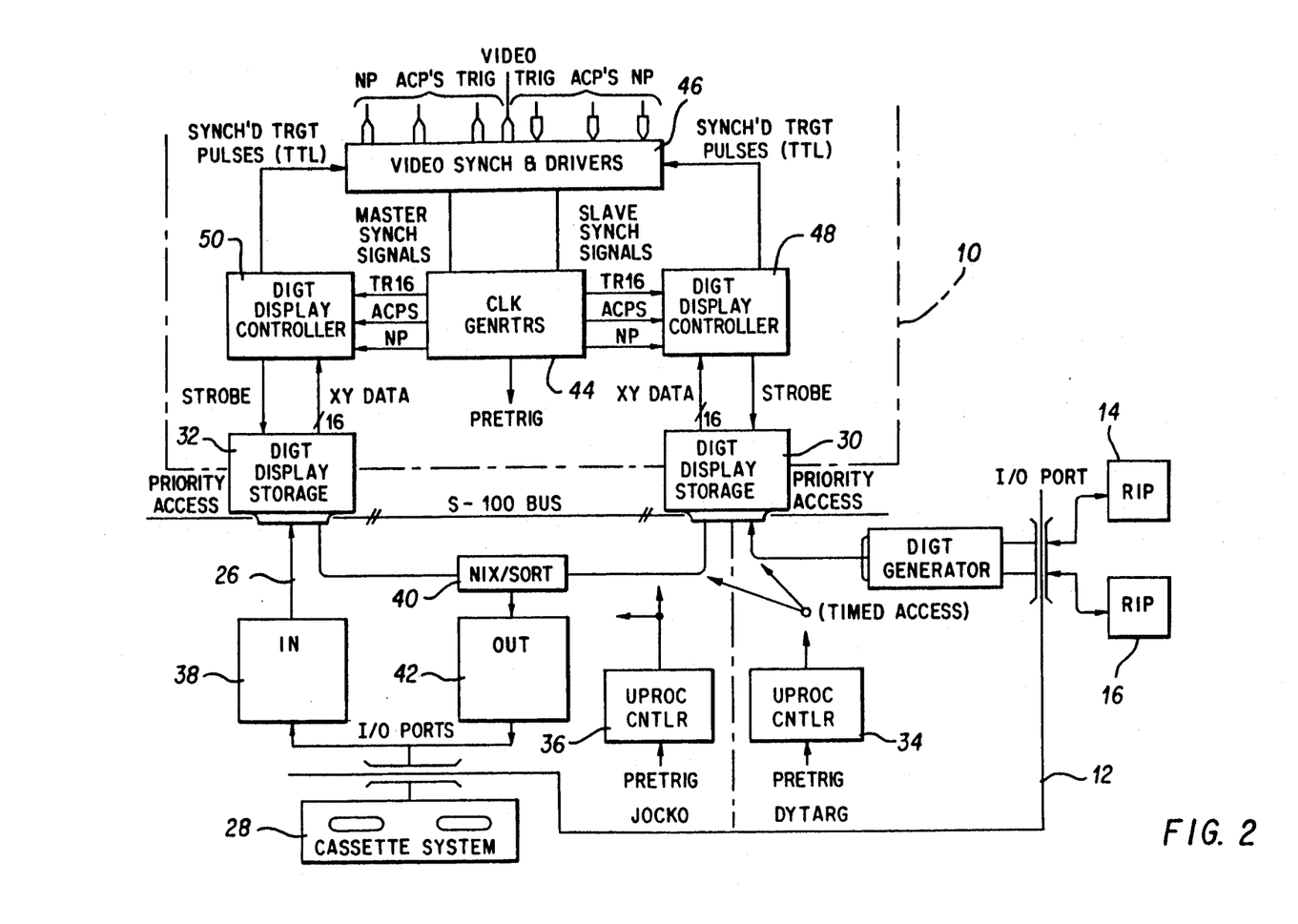
FIG. 2 is a block diagram of general function data flow in the simulated target motion generator.

Data flow through the system is shown in FIG. 2. Data flows from panels 14, 16 through dynamic generator 12 into display generator 10. It is input into panels 14 or 16, interfaces with and flows into dynamic generator 12 where it is transformed by a microprocessor 34 into binary data, and then input into display generator 10, in digit display storage 30, to be strobed on the basis of comparison signals.

The other storage device in display generator 10 is pre-programmed display storage 32, constituting, with storage 30, dual port memories. They are located on a computer bus. Microprocessors 34, 36 in dynamic generator 12 and preprogrammed generator 26 operate with software programs to handle data flow, time and run data, and perform mathematical calculations for system operation.

Data flows from device 28 through pre-programmed generator 26 into display generator 10. Data stored in device 28, as on a tape in a cassette system, is retrieved, as by playback thereof, through an interface and flow into pre-programmed generator 26. In pre-programmed generator 26, for playback, data flows through microprocessor 36 to time and run the data, through an input buffer 38, directly into storage 32 of display generator 10 for access thereby. For recording, data is pulled out from dynamic and pre-programmed generators 12 and 26 on a strobe after display, mixed and sorted in a mixer-sorter 40 with data from dynamic generator 12, put into output buffer 42, and at an appropriate time recorded on device 28. A high density data transfer takes place between the input/output functions at pre-programmed generator 26.

In display generator 10, clock generator 44 provides timing to the rest to the system. It generates clock signals, either from its own hardware clocks built in and timed, or, through interfacing with a display synchronizer and driver 46, which interfaces with the display A clock signals which override the hardware clocks in generator 44, through sensor system synchronization. Generator 44 provides pulses to dynamic display controller 48 and to pre-programmed display controller 50. Controllers 48 and 50 wait for appropriate timing signals, then flag clock pulses and unblanking pulses from driver 46, which converts digital signals to analog signals, for example, for display of simulated returns.

Driver 46 takes input signals from the sensor system, counts such signals, provides a comparator of current and next positional information from device A and controllers 48 and 50, and enhances and transforms the signals, for input into device A.

Figure 3:
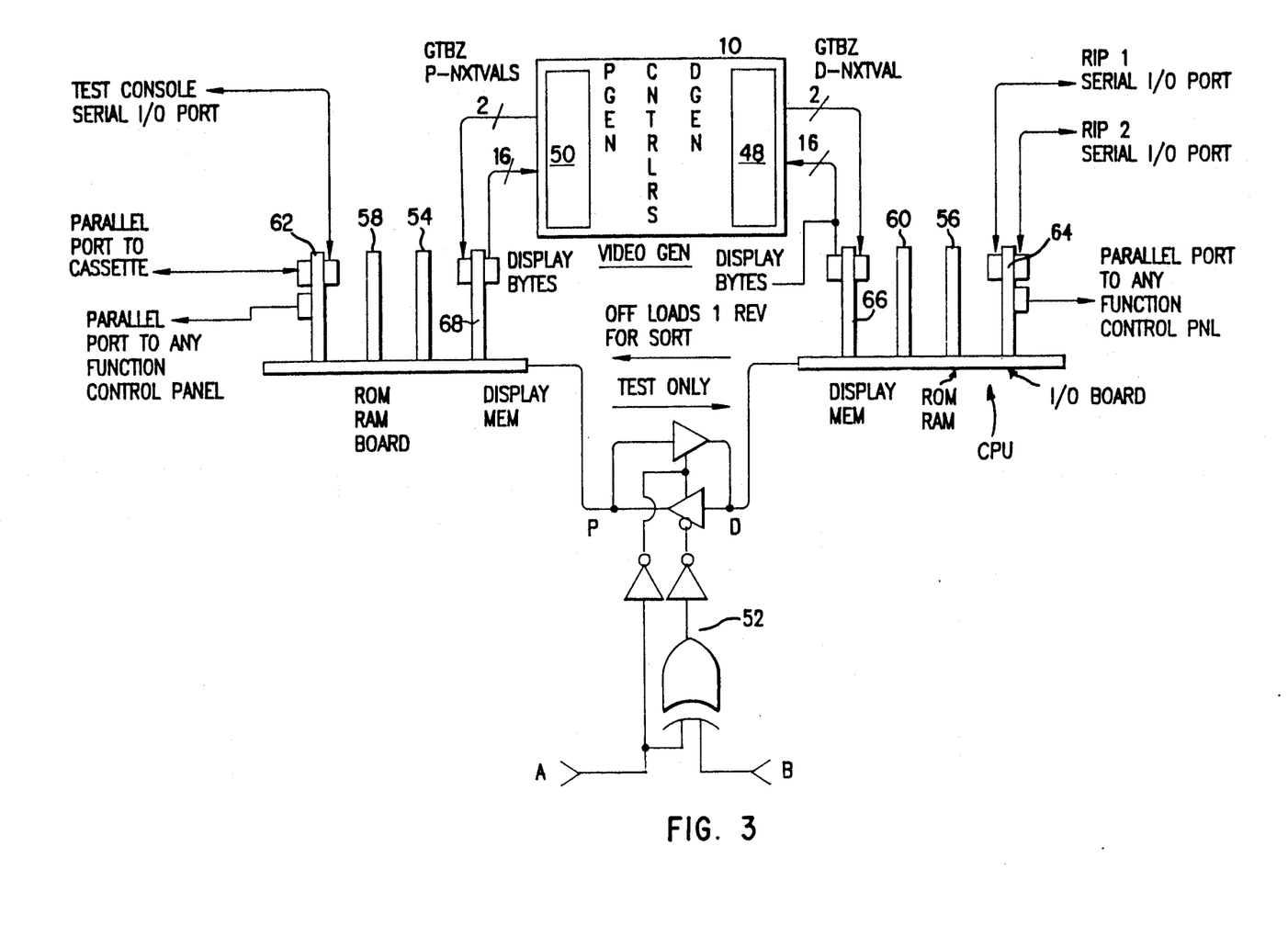
FIG. 3 is a schematic diagram of a general bus and port data flow of the simulated target motion generator.

As shown in FIG. 3, arbiter 52 directs data flow for the dual microprocessor system and interacts with microprocessors 34, 36 in pre-programmed generator 26 and dynamic generator 12. Each generator microprocessor includes, as hardware, a CPU board 54, 56, a ROM/RAM board 58, 60, and input/output cards 62, 64 which interface with panels 14, 16, device 28 and other devices. Dual port display memory boards 66, 68 are interconnected to controllers 48, 50.

Figure 4:
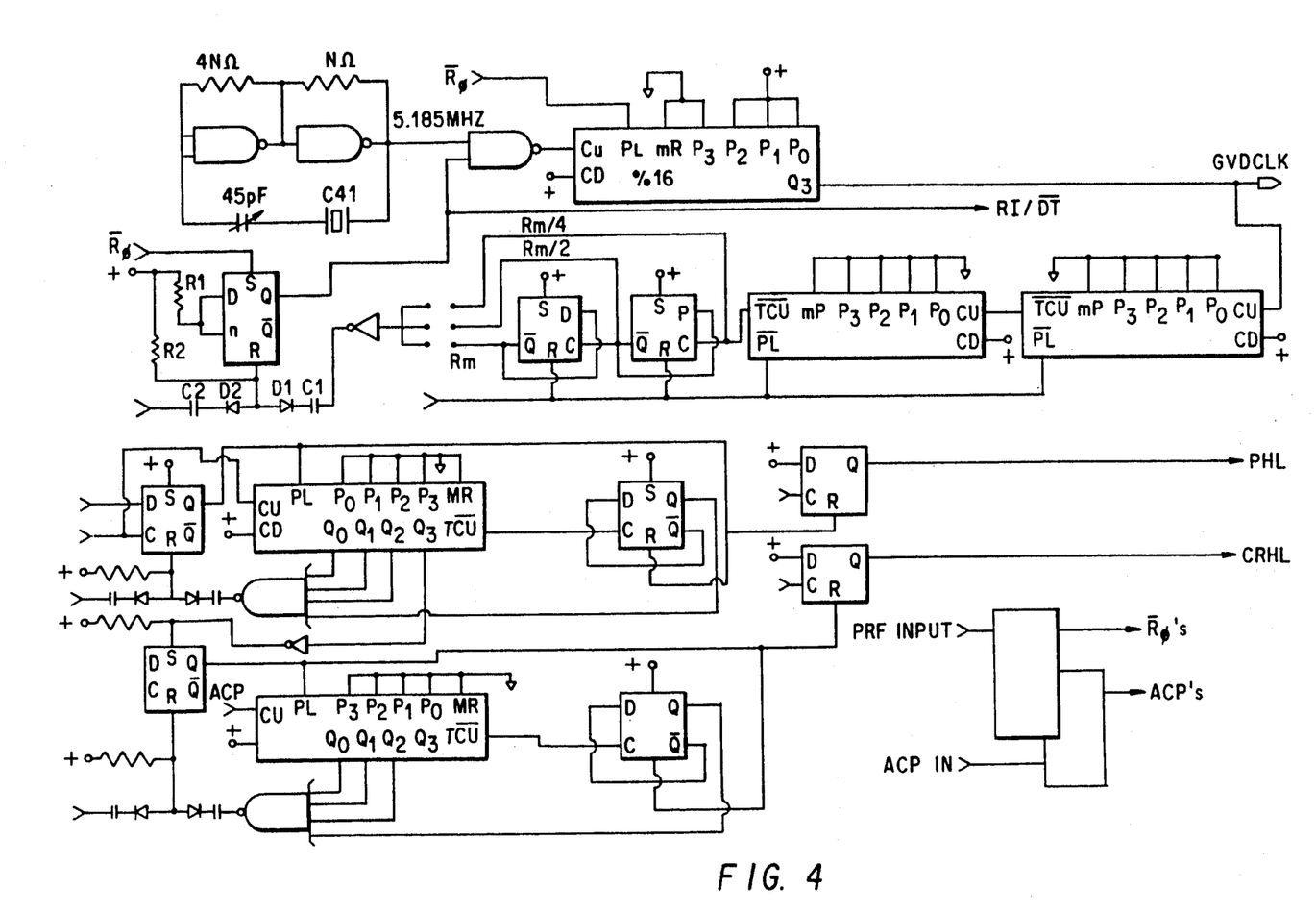
FIG. 4 is a logic diagram of the clock generator function of the target display generator function module.

In FIG. 4, a logic diagram of hardware in clock generator 44 of display generator 10 is shown. Clock generator 44 sets the timing for the remainder of the system. A crystal control oscillator is divided down through a series of dividers for range pulse and recovery signal generation, to advise the system when to start sweeping, and when to release the memory cells for display unblanking pulses. In the event of overlapping targets, aside from the main target generator, an offset target generator is provided to separate closely-positioned targets, called up by the software which senses target proximity.

Figure 5:
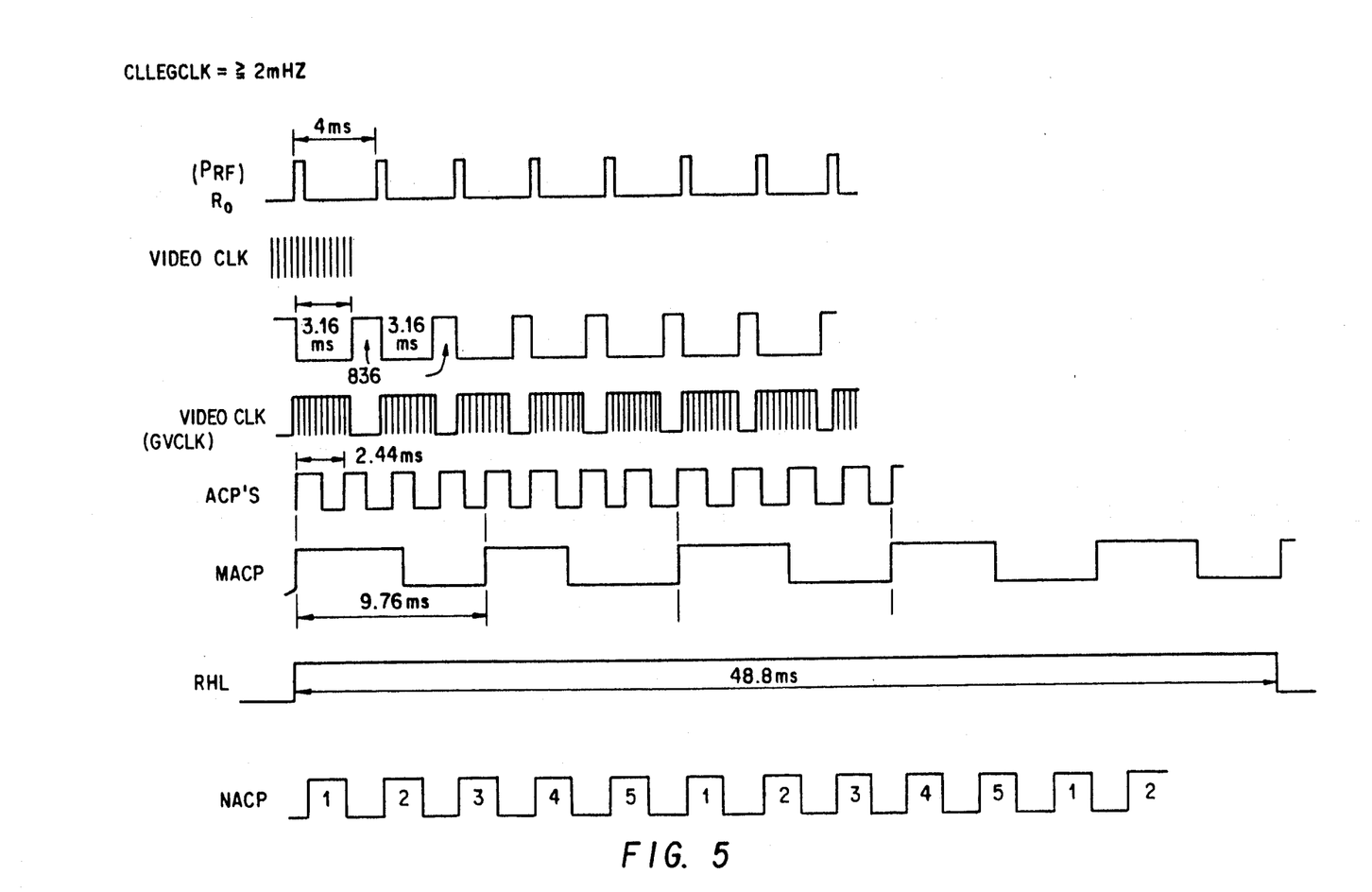
FIG. 5 is a diagram of a plurality of timing pulses in the system.
Figure 6:
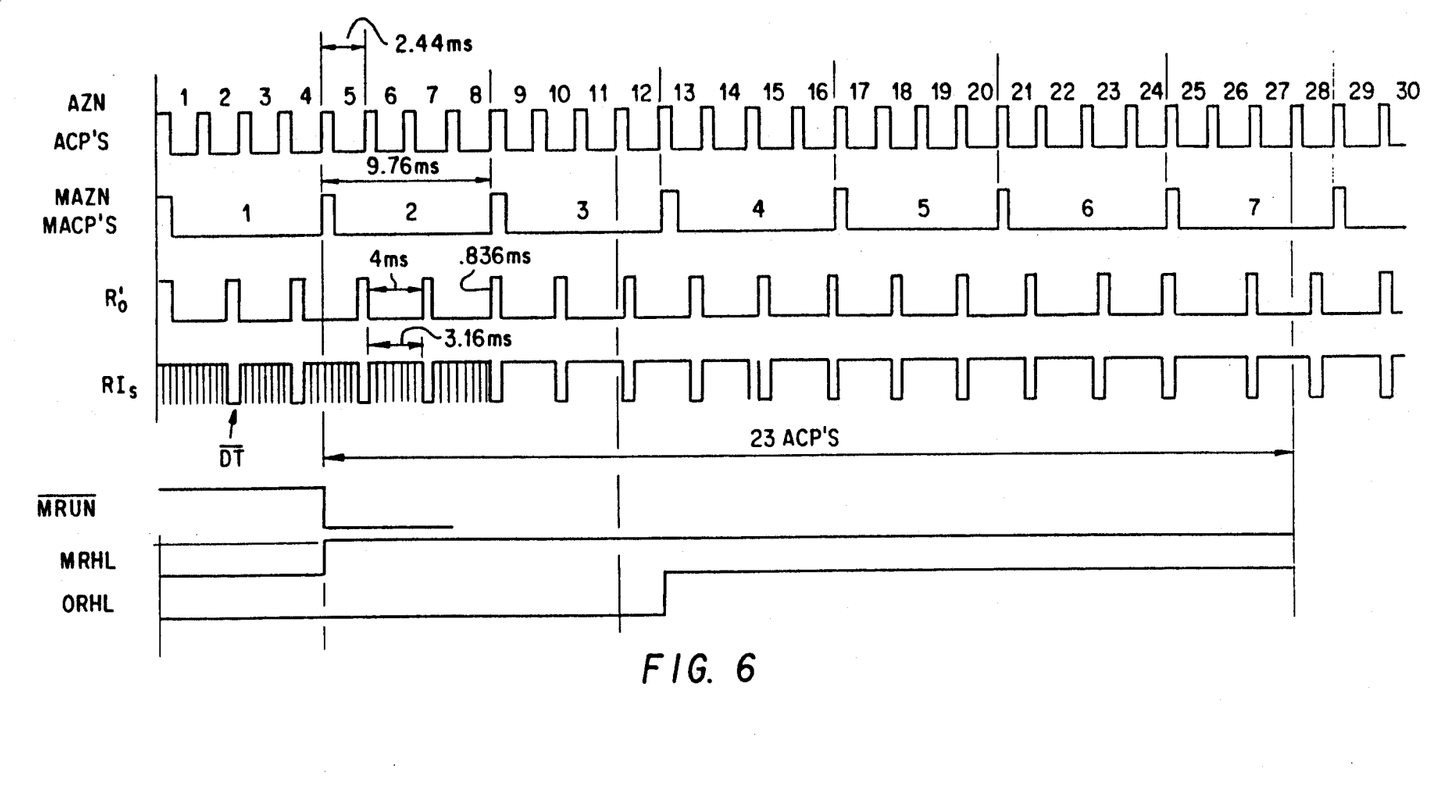
FIG. 6 is a similar diagram in an expanded version thereof.

A plurality of basic system timing pulses are shown in FIG. 5. Such pulses include trigger range "0" pulses display clock for unblanking pulses, range interval pulses, gated video clock, azimuth change pulses, positioning pulses, run-hit length, and main timing pulse. An expanded correlated version of the plurality of timing pulses described above is shown in FIG. 6.

Figure 7:
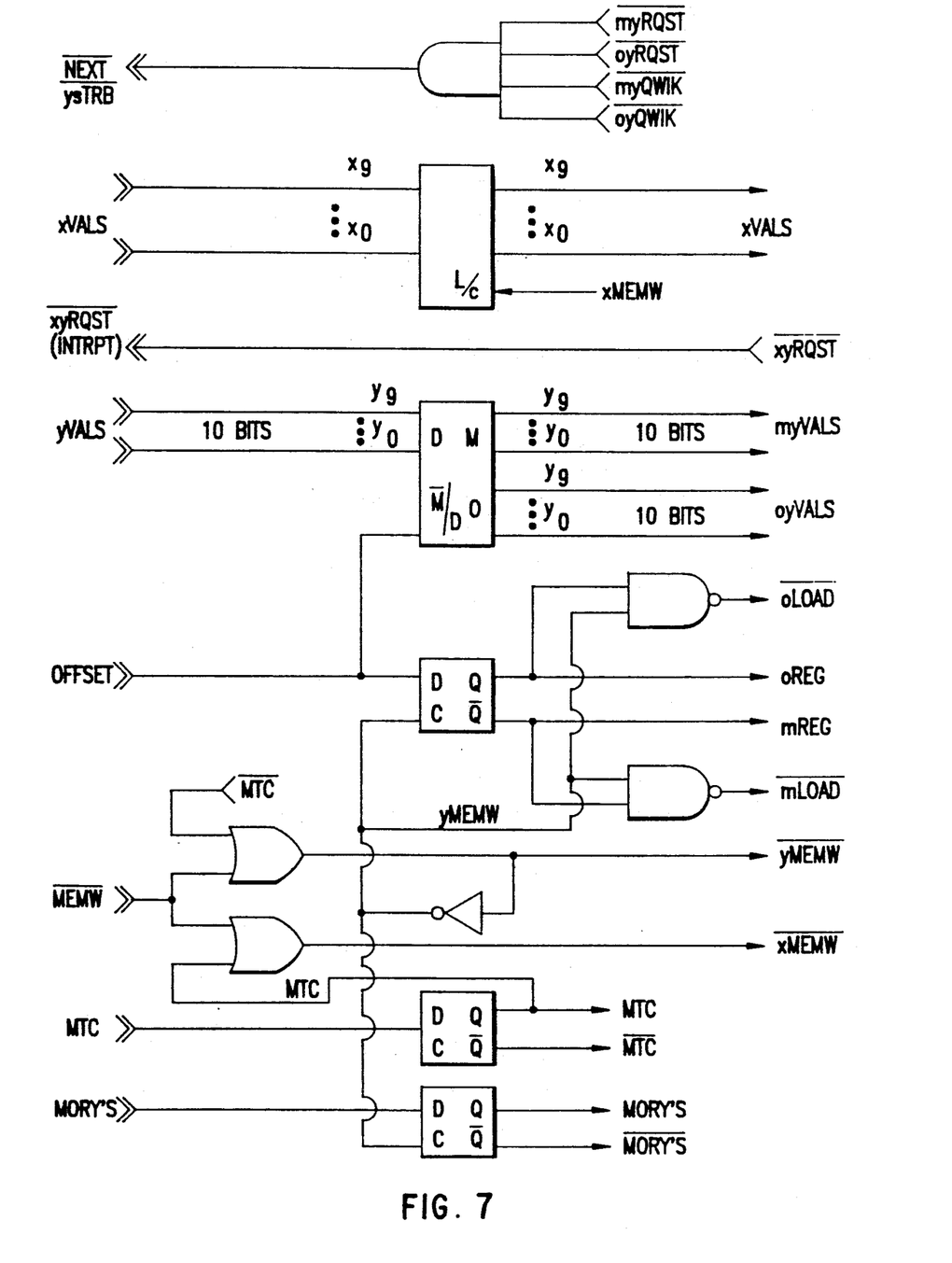
FIG. 7 is a logic diagram of control codes at an interface between the system hardware and software.

FIG. 7 shows a logic diagram of control codes at the interface between system software and hardware. Such codes comprise flags set by the software in the hardware controller to turn on comparators and load data in display generator 10. All targets on a particular range-radial are loaded into the display device A, triggered by the display generator 10 counting azimuth pulses, the software advising of the next azimuth range at which a target is present, a comparison is made, the computer target memory off-loads the targets at the particular range valves upon signalling by the comparator, and a gated display strobe pulses out per sweep of radar to make unblanking pulses.

Figure 8:
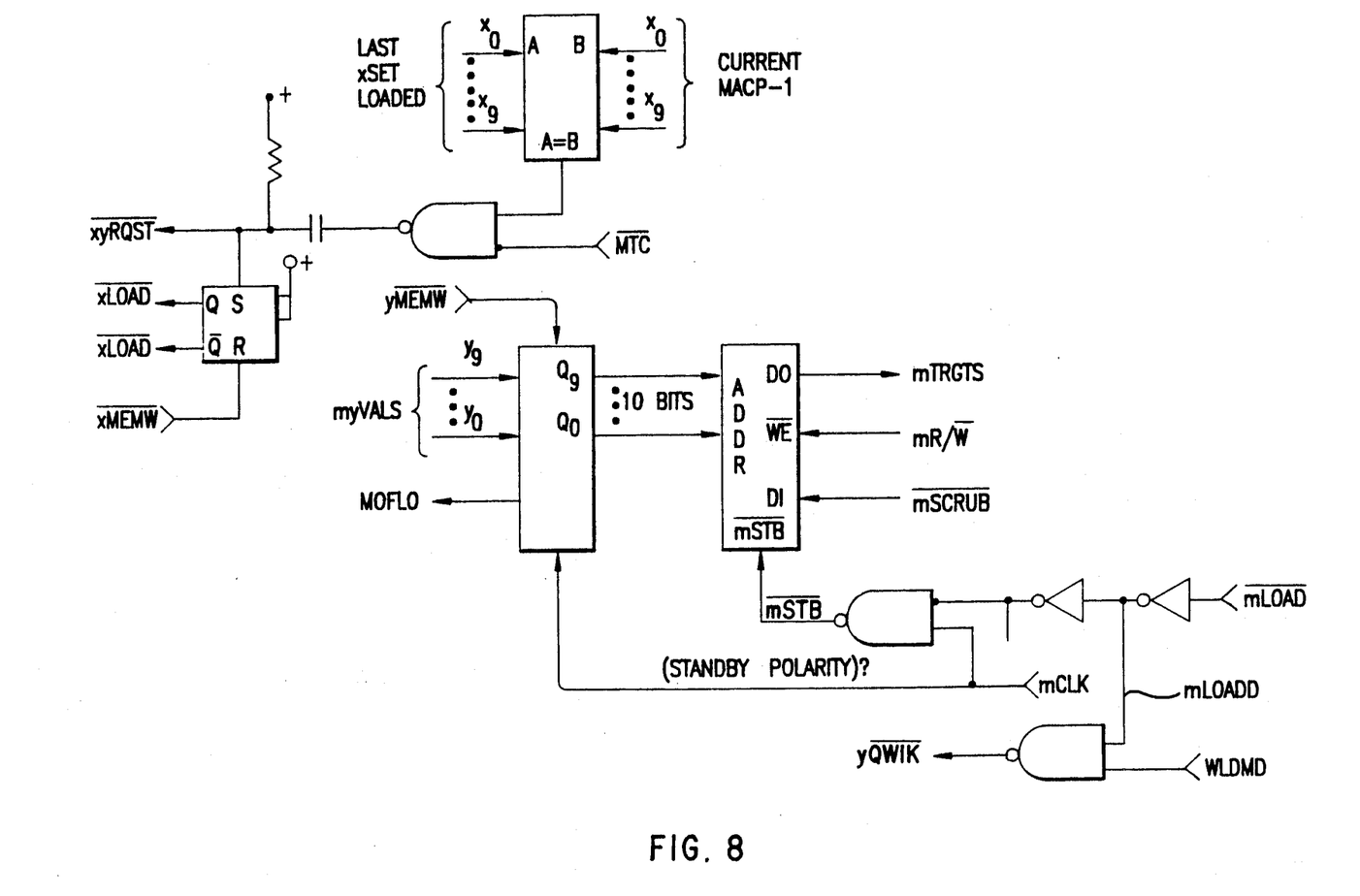
FIG. 8 is a logic diagram of the position comparison load dection function in the system.

A logic diagram of the position comparison load detection function is shown in FIG. 8, comparing the last loaded and current azimuth values to draw from main and offset target memory.

Figure 9:
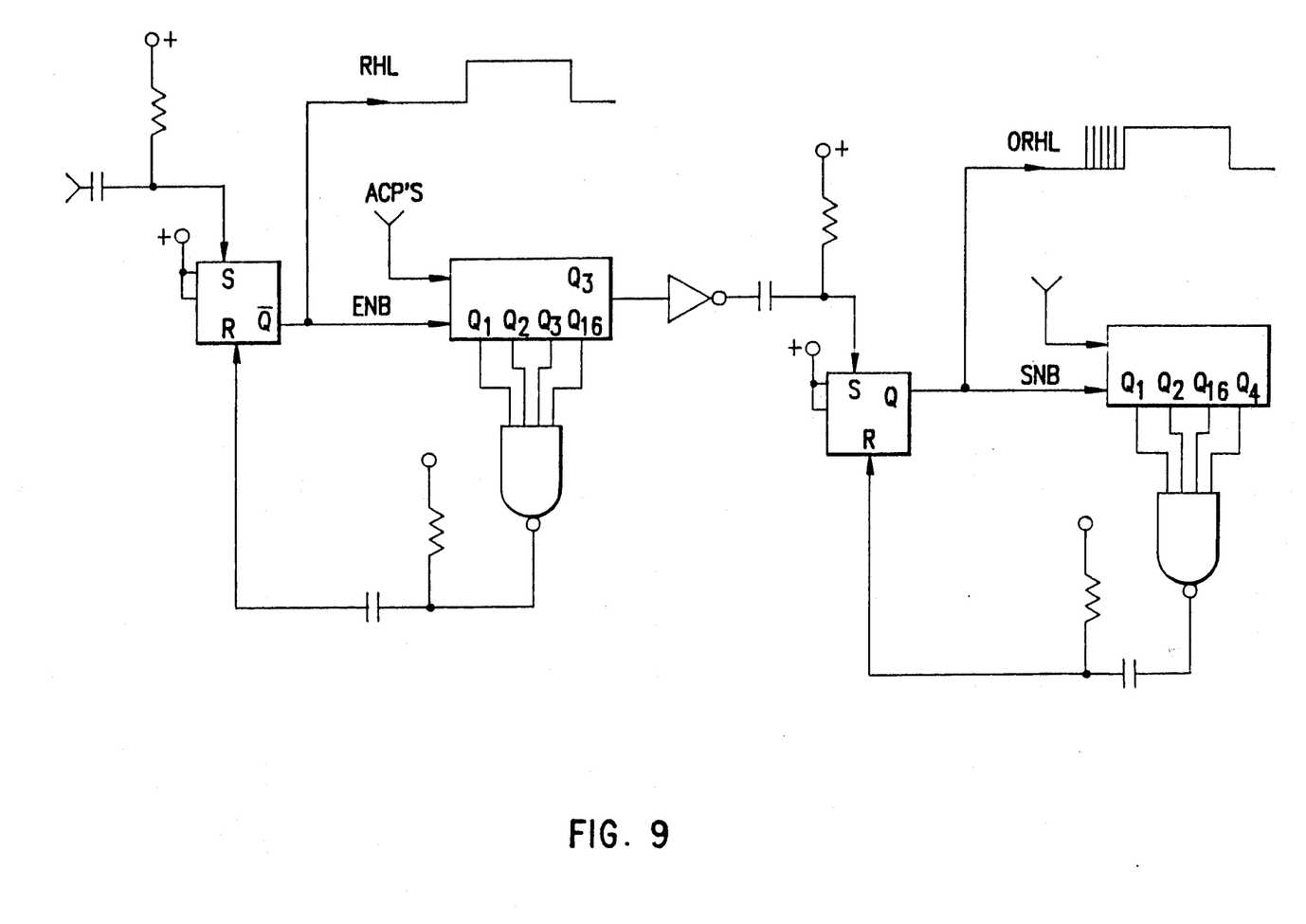
FIG. 9 is a diagram of the run/hit length generator function in the system.

The run/hit length generator functions for synchronizing timing pulses as shown in FIG. 9, for the main and offset target generators. The main generator is always operational, with offset generator less than 3° behind the main generator, operational if a target is located therein.

Figure 10:
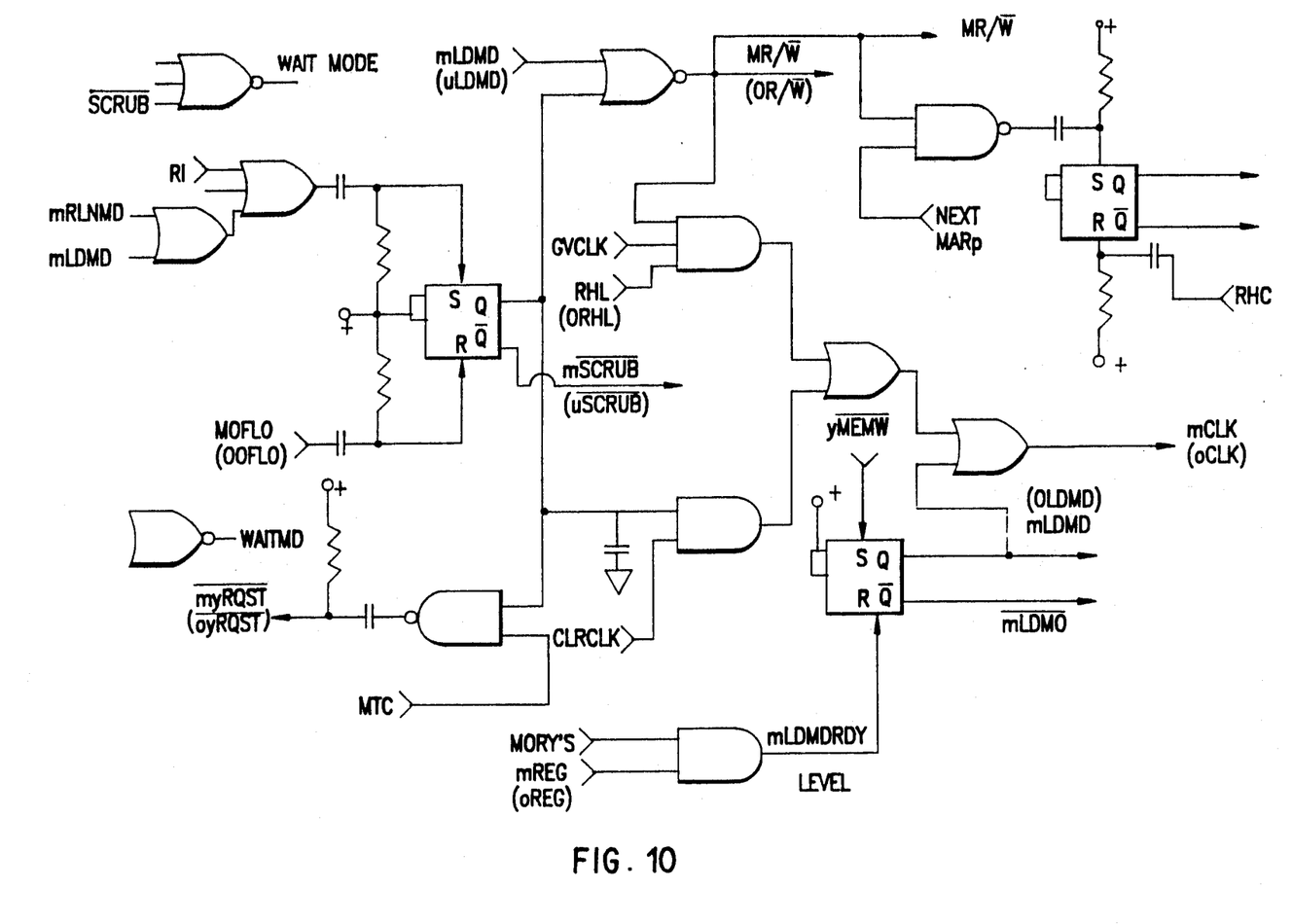
FIG. 10 is a diagram of the mode controller for the control signals for the target display generator in the system.
Figure 11:
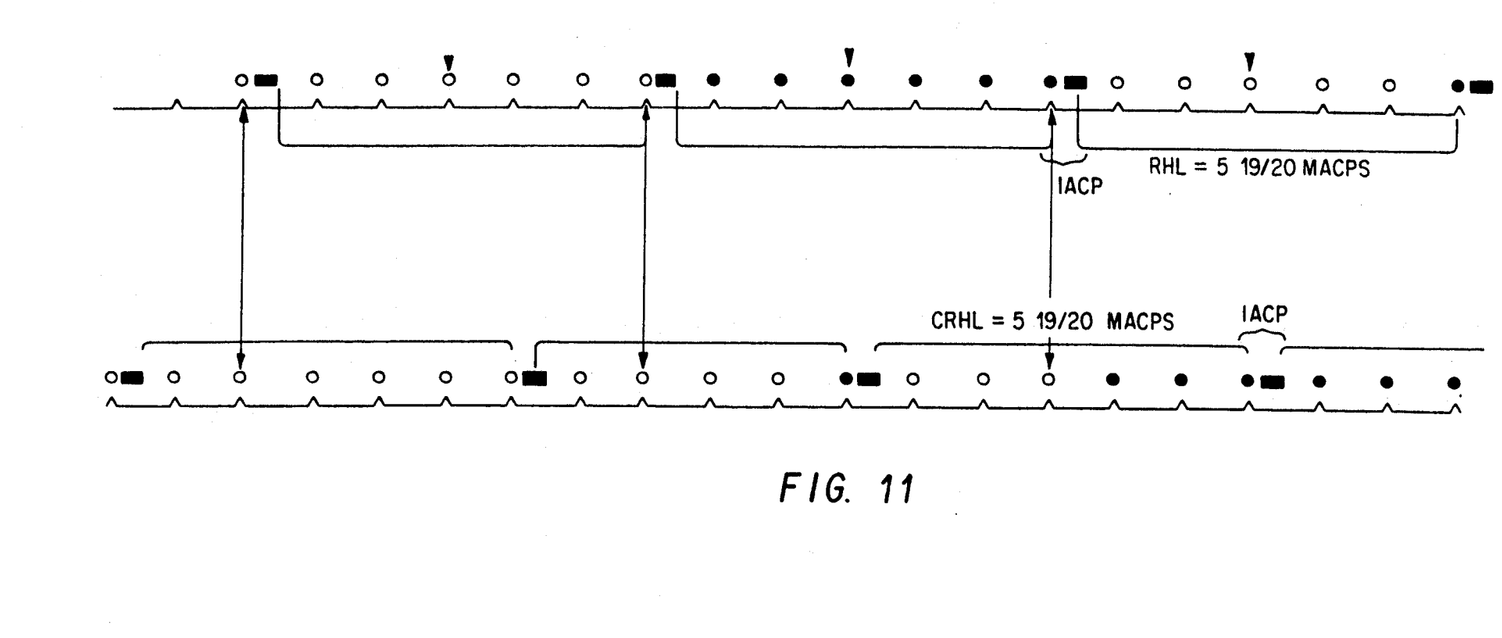
FIG. 11 is a symbolic diagram of frame timing between the main target generator and offset target generator in the system.
Figure 12:
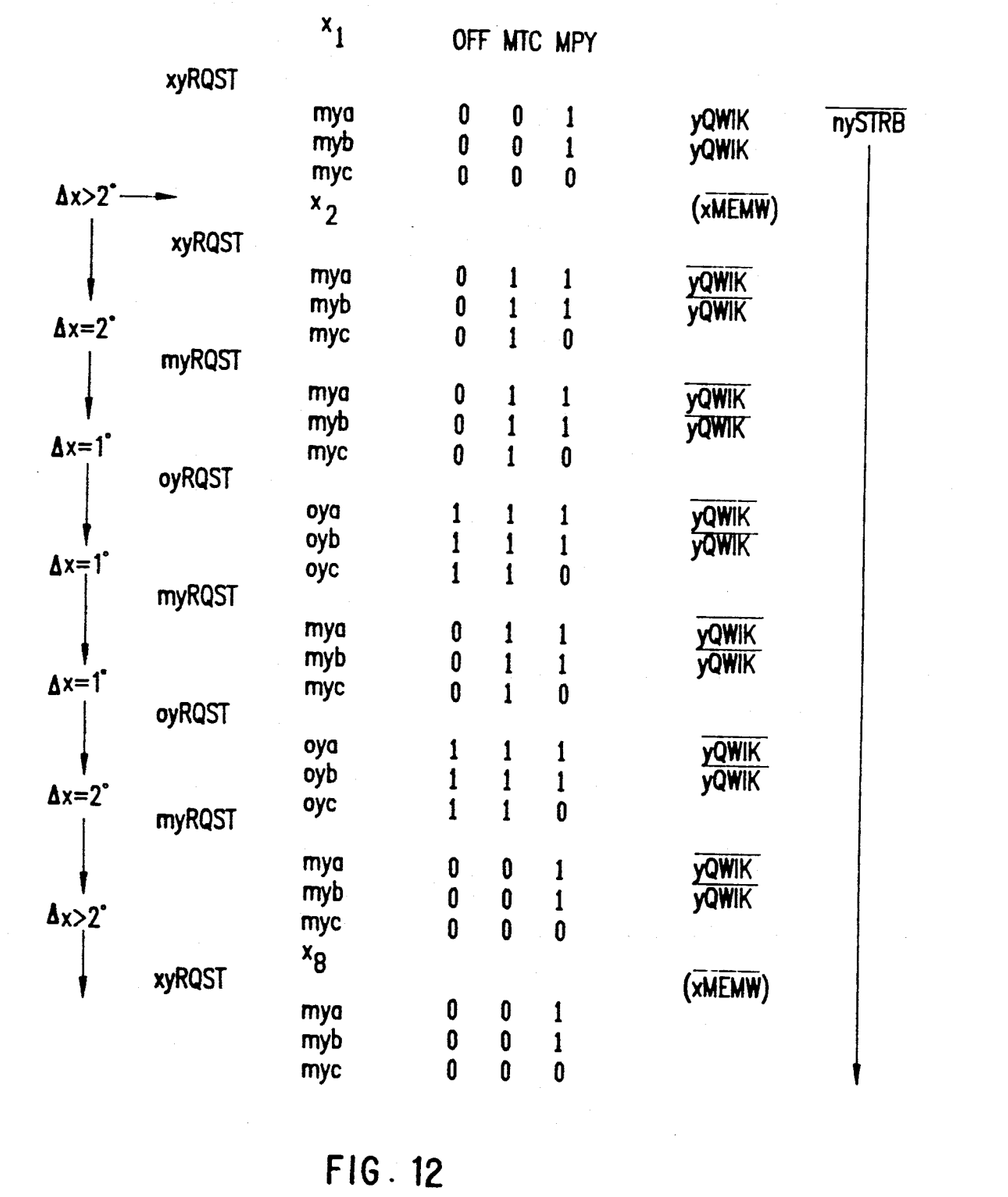
FIG. 12 is a diagram of the strobe pattern for exemplary operation of the main target generator and offset target generator in the system.

In FIG. 10, a mode controller for precisely-timed data flow control signals, for running the target display generator 10, is shown. FIG. 11 is a diagram symbolically depicting frame timing between the main and offset target generators. The flag signals for strobe patterns for exemplary operation of the main and offset target generators is shown in FIG. 12. The offset range generator is activated for a 1° range separation.

The simulated target motion generator may be used for many types of training exercises, such as for training in refueling tactics, intercept tactics, air traffic control, or ground control, consistent with operations conducted at the particular site thereof. At any such site, the person in charge can configure specific training exercises for the particular operation. These exercises can then be recorded for scheduled training sessions.

Further, such generator is portable and compact. This enables, for example, retrofitting and use thereof on standard tables presently incorporated in vehicles used for tracking target motion, which vehicles include target motion display devices therein, such as on map tables in vans which include radar scopes therein. The generator may be efficiently and conveniently used and transported, for example, by being packed with the vehicle when the vehicle goes into the field, or by being flown by aircraft, with the vehicle, while loaded in the vehicle and shipped in the aircraft. System changes may be readily effected by changes in the software operating system cassette, without changing the hardware.

The generator does not require any personnel other than the operator trained in the particular tracking functions to set up and operate for training purposes. No maintenance or other skilled operational personnel are required. It is readily connected and disconnected, and is modularized for convenience of maintenance. It can be coupled to the display device, and operated whether the actual tracking system is operating or not. It works in either the master or slave mode. As a master, it provides life-like displays for training purposes. As a slave, it can let the actual system produce actual tracking displays as background, and do the simulated displays at the same time, as a second display channel on the display device. Other target display generators, similarly timed, may be included within the system, by formulating unblanking pulses differently, to provide other types of radar returns, such as, for example, IFF, stripes, electronic countermeasure patterns, video mapping, or graphics.

A preferred embodiment of the invention has been set forth above, for the purpose of explaining the invention. However, it is to be understood that variations may be made in such embodiment, which variations are nevertheless within the scope and spirit of the invention, as set forth in the claims herein.

I claim:

1. A portable compact apparatus for generating simulated motion on a display device, of a plurality of targets, each representing a movable object, for providing training exercises in analyzing and responding to simulated target motion, adapted to compute and generate data to be transmitted to the display device representing the incremental positions, as a function of time, of the targets in simulated motion, comprising:

(a) means for generating target displays, adapted to generate simulated target motion signals, to interface with the display device inputs, and to transmit the simulated target motion signals for driving the display device responsive thereto;

(b) means for generating dynamic target motion, microprocessor-based, adapted to receive controlled target motion data, initiating or modifying motion of controlled targets in real time, and to convert the target motion data into data for input into the target display generating means;

(c) means for remotely generating controlled target motion data in real time, microprocessor based, adapted to enable the operator to interface with, and control the functions of, the dynamic target motion generating means for initiating or modifying motion of the controlled targets in real time; and (d) a portable compact device for storing previously-displayed dynamic target data received from said dynamic target motion generating means.

2. An apparatus as in claim 1, further comprising means for generating pre-programmed target motion, microprocessor based, adapted to receive, and transmit to the display generating means, pre-programmed data for pre-programmed target motion, said portable compact device also storing data received from said pre-programmed target motion generating means.

3. An apparatus as in claim 2, further comprising a portable compact device for retrieving pre-programmed target motion data, for driving the pre-programmed target motion generating means.

4. An apparatus as in claim 2, further adapted for simultaneous real-time operation of the dynamic target motion generating means and the pre-programmed target motion generating means, to generate simultaneous real-time pre-programmed and dynamic simulated target motion.

5. A portable compact apparatus for generating simulated motion on a display device, of a plurality of targets, each representing a movable object, for providing training exercises in analyzing and responding to simulated target motion, adapted to compute and generate data to be transmitted to the display device representing the incremental positions, as a function of time, of the targets in simulated motion, comprising:

(a) means for generating target displays, adapted to generate simulated target motion signals, to interface with the display device inputs, and to transmit the simulated target motion signals for driving the display device responsive thereto;

(b) means for generating pre-programmed target motion, microprocessor-based, adapted to receive and transmit to the display generating means, pre-programmed data for pre-programmed target motion; and (c) means for generating dynamic target motion simultaneously with pre-programmed target motion, microprocessor-based, adapted to receive controlled target motion data, initiating or modifying motion of controlled targets, and to convert the target motion data into data for input into the target display generating means, and means for remotely generating controlled real-time target motion data, microprocessor-based, adapted to enable the operator to interface with, and control the functions of, the dynamic target motion generating means for initiating or modifying motion of the controlled targets in real time.

6. An apparatus as in claim 5, further comprising a portable compact device for retrieving pre-programmed target motion data, for driving the pre-programmed target motion generating means.

7. A portable compact apparatus for generating simulated motion on a display device, of a plurality of targets, each representing a movable object, for providing training exercises in analyzing and responding to simulated target motion, adapted to compute and generate data to be transmitted to the display device representing the incremental positions, as a function of time, of the targets in simulated motion, comprising:

(a) means for generating target displays, adapted to generate simulated target motion signals, to interface with the display device inputs, and to transmit the simulated target motion signals for driving the display device responsive thereto;

(b) means for generating dynamic target motion, microprocessor-based, adapted to receive controlled target motion data, initiating or modifying motion of controlled targets, and to convert the target motion data into data for input into the target display generating means, said dynamic target motion generating means being further adapted to generate output data for transmission to the pre-programmed target motion generating means;

(c) means for remotely generating controlled target motion data, microprocessor based, adapted to enable the operator to interface with, and control the functions of, the dynamic target motion generating means for initiating or modifying motion of the controlled targets; and (d) means for generating pre-programmed target motion, microprocessor based, adapted to receive, and transmit to the display generating means, pre-programmed data for pre-programmed target motion, said pre-programmed target motion generating means being further adapted to correlate previously-displayed dynamic and pre-programmed target data; and a portable compact device for storing data received from the pre-programmed target motion generating means and dynamic target motion generating means.

8. An apparatus as in claim 7, further adapted for simultaneous operation of the dynamic target motion generating means and the pre-programmed target motion generating means, to generate simultaneous pre-programmed and dynamic simulated target motion.

9. A portable compact apparatus for generating simulated motion on a display device, of a plurality of targets, each representing a movable object, for providing training exercises in analyzing and responding to simulated target motion, adapted to compute and generate data to be transmitted to the display device representing the incremental positions, as a function of time, of the targets in simulated motion, comprising:

(a) means for generating target displays, adapted to generate simulated target motion signals, to interface with the display device inputs, and to transmit the simulated target motion signals for driving the display device responsive thereto; and (b) means for generating pre-programmed target motion, microprocessor-based, adapted to receive and transmit to the display generating means, pre-programmed data for pre-programmed target motion, said pre-programmed target motion generating means being further adapted to correlate previously-displaced dynamic and preprogrammed target data;

(c) means for generating dynamic target motion, microprocessor-based, adapted to receive controlled target motion data, initiating or modifying motion of controlled targets, and to convert the target motion data into data for input into the target display generating means, means for remotely generating controlled target motion data, microprocessor based, adapted to enable the operator to interface with, and control the functions of, the dynamic target motion generating means for initiating or modifying motion of the controlled targets, said dynamic target motion generating means being further adapted to generate output data for transmission to the pre-programmed target motion generating means; and (d) a portable compact device for storing data received from the pre-programmed target motion generating means and dynamic target motion generating means.

10. An apparatus as in claim 9, further comprising a portable compact device for retrieving pre-programmed target motion data, for driving the pre-programmed target motion generating means.

* * * * *